United States Patent [19]

Kytta

[11] Patent Number: 4,569,276

[45] Date of Patent: Feb. 11, 1986

[54] CONNECTION FOR CLOSING A SERVOMOTOR

[75] Inventor: Oswald O. Kytta, South Bend, Ind.

[73] Assignee: Allied Corporation, Morristown, N.J.

[21] Appl. No.: 627,313

[22] Filed: Jul. 2, 1984

[51] Int. Cl.[4] ............................ F01B 19/00; F16J 3/00
[52] U.S. Cl. ..................... 92/98 D; 92/169; 403/50; 403/349
[58] Field of Search ............ 91/369 A, 369 B, 369 R, 91/376 R; 403/348, 349, 50, 51; 92/98 D, 98 R, 169 R

[56] References Cited

U.S. PATENT DOCUMENTS

| | | | |
|---|---|---|---|
| 2,339,876 | 1/1944 | Phillips | 92/98 R |
| 3,168,907 | 2/1965 | Mercier et al. | 92/98 R |
| 3,218,978 | 11/1965 | Kalert, Jr. | 92/98 R |
| 3,478,519 | 11/1969 | Eggstein | 91/376 R |
| 4,338,854 | 7/1982 | Margetts | 92/98 D |

*Primary Examiner*—Paul E. Maslousky
*Attorney, Agent, or Firm*—Leo H. McCormick, Jr.; Ken C. Decker

[57] ABSTRACT

A connection (40) for joining a front shell (12) to a rear shell (14) to create a housing for a fluid pressure servomotor (10). The peripheral surfaces of the first (12) and second shells (14) have a conical section (46,58) and a radial section (48,60). The conical sections (46,58) are designed to mate prior to the radial sections (48,60) engaging each other to assure that a minimum contact occurs in order to seal the housing.

6 Claims, 5 Drawing Figures

CONNECTION FOR CLOSING A SERVOMOTOR

This invention relates to a fastening means for connecting a first shell to a second shell to create a housing for a fluid pressure servomotor.

In servomotors used as a power source for a brake system during manufacture, the diameter of the front and rear shells may be distorted as the tolerances in dies change as a result of use. Should the tolerances reach a maximum in opposite direction for the front and rear shells, when the front shell is connected to the rear shell a potential leak could occur when vacuum is introduced into a resulting housing. A possible solution to correct such leaks is shown in U.S. Pat. No. 3,977,299 wherein a groove is placed in the shell to urge the head of the diaphragm into engagement with a flange on the rear shell. Unfortunately, placing the groove in the front shell adds to the manufacturing cost of a servomotor.

The connection for joining a first shell to a second shell to create a housing for a fluid pressure servomotor of this invention has matching closure surfaces on the front shell and the rear shell. In each shell, a conical surface extends from a radial surface. The conical surfaces on the front and rear shells allows for a minimum eccentricity while at the same time maintaining some positive contact between the shells. A protrusion on the front shell receives a tab on the rear shell to align the front shell with respect to the rear shell. Tabs on the front shell engage the rear shell to maintain the first and second sealing surfaces in contact with each other.

An advantage of this invention occurs through the engagement of first and second conical surfaces and first and second radial surfaces to permit a minimum amount of eccentricity between the first and second shells while still assuring that some contact occurs to produce a sealing surface.

It is therefore an object of this invention to provide a servomotor with a connection for joining a front shell to a rear shell through the engagement of radial and conical surfaces on both the front and rear shell.

The invention will now be described with reference to the accompanying drawings wherein.

Figure 1:
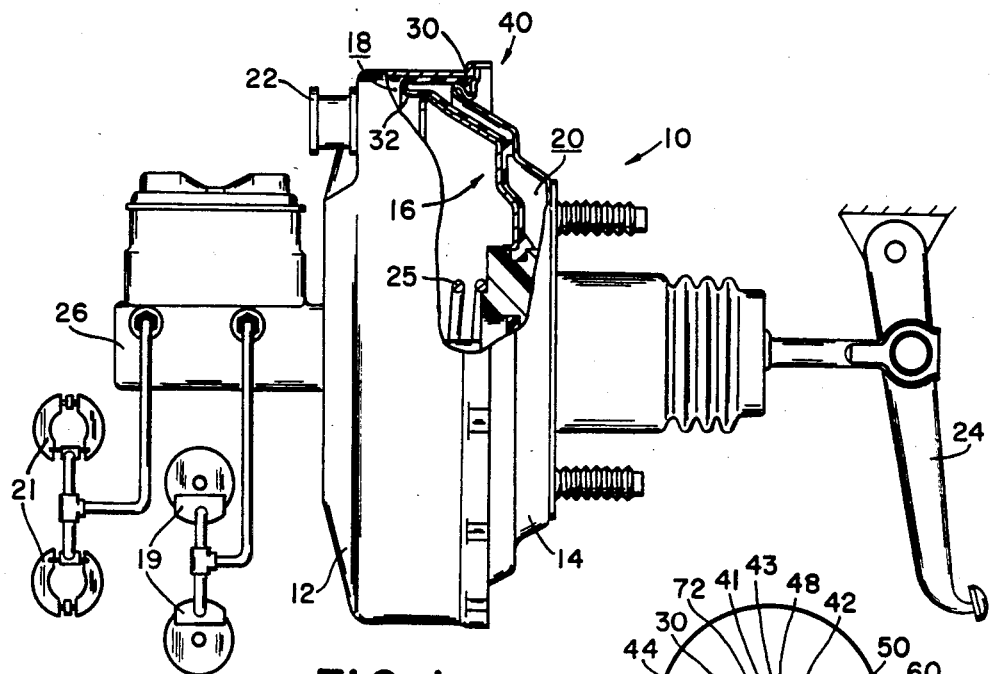
FIG. 1 is a schematic illustration of a fluid pressure servomotor made according to the principles of this invention.

In the fluid pressure servomotor 10 shown in FIG. 1, a front shell 12 is joined to a rear shell 14 to form a housing. A wall arrangement 16 divides the housing into a front chamber 18 and a rear chamber 20. The front chamber 18 is connected to a source of vacuum through conduit 22 and to the rear chamber 20 through a valve of the type disclosed in U.S. Pat. No. 3,977,299. In response to an input applied to brake pedal 24, the valve is actuated and air is allowed to enter chamber 20 to create a pressure differential across the wall arrangement 16. The pressure differential acts on and moves the wall arrangement 16 toward the front chamber 18. Movement of the wall produces a force that is transferred to pistons in a master cylinder 26 to provide the brakes 19 and 21 of the front and rear wheels with pressurized fluid to effect a brake application. On termination of the input force on pedal 24, a return spring 25 acts on and moves the wall arrangement 16 toward its rest position shown in FIG. 1 as vacuum in the front chamber 18 evacuates air from rear chamber 20.

Figure 2:
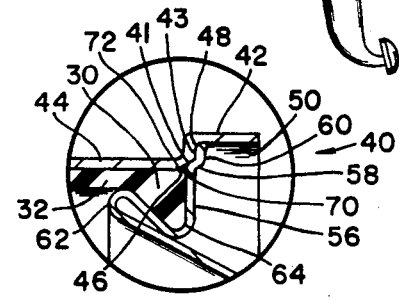
FIG. 2 is a sectional view taken along line 2—2 of FIG. 3.
Figure 3:
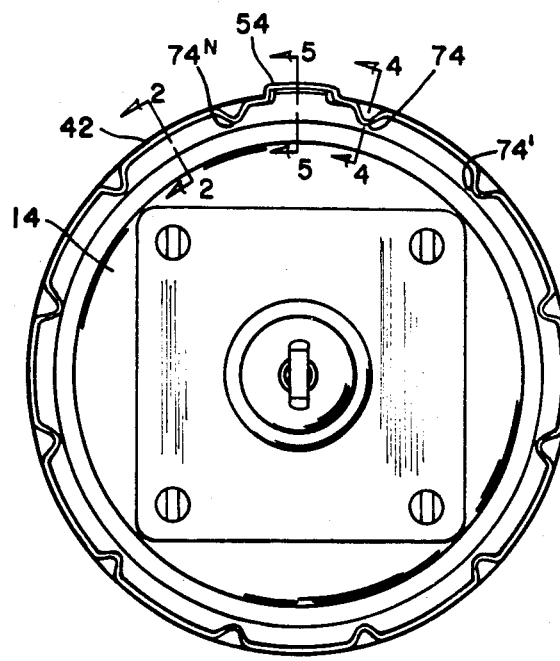
FIG. 3 is an end view of the servomotor of FIG. 1.
Figure 4:
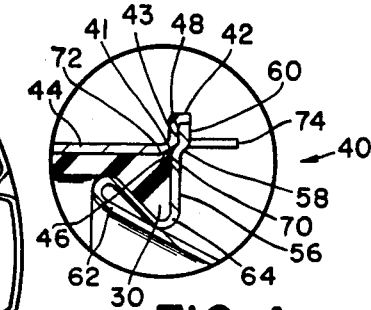
FIG. 4 is a sectional view taken along line 4—4 of FIG. 3 showing the fastener tabs.
Figure 5:
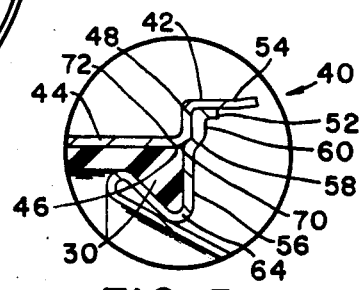
FIG. 5 is a sectional view taken along line 5—5 of FIG. 3 showing the locator tab for aligning the front shell with the rear shell.

If the bead 30 on the diaphragm 32 of the wall arrangement 16 is not sealed with respect to the front and rear shells 12 and 14, respectively, a leak path for air may occur in chambers 18 and 20 and reduce the vacuum level therein. If the vacuum level is reduced, any resulting pressure differential development and consequently the output force could be adversely effected. The connection 40 as best shown in FIGS. 2, 4 and 5 has a series of sealing surfaces 41 and 43 that reduce the possibility of a leak path occurring between chambers 18 and 20 and the surrounding environment. The connection 40 includes a flange 42 located on cylindrical body 44 of shell 12. The interior surface of flange 42 has a conical section 46 connected to a radial surface 48 that extends from cylindrical surface 50. The rear shell 14 which has a general shape of a disc has a peripheral lip with an axial tab 52, see FIG. 5, that engages outward protrusion 54 on flange 42 to align rear shell 14 with front shell 12. In some instances the tab 52 may not be necessary and thus the protrusion 54 can also be eliminated.

The peripheral lip has a radial surface 56 that is substantially in a plane perpendicular to cylindrical body 44. A conical surface 58 extends from radial surface 56 to radial surface 60. Conical surface 58 is parallel to conical surface 46 while radial surface 56 is parallel to radial surface 48. An annular lip 62 extends from radial surface 56 to define a groove 64 for retention of bead 30. The size of bead 30 is such that a resilient seal is established between groove 64 and cylindrical body 44, at the same time conical surface 58 engages conical surface 46 to establish a mechanical seal 41 between the rear shells 14 and front shell 12. The length of conical surface 58 is such that end 70 may extend past edge 72 to assure that the mechanical seal is achieved. Conversely, if tolerances are in the other direction, end 70 may not reach edge 72, however, a good mechanical seal still is achieved. Idealy end 70 and edge 72 meet at the same point and a second mechanical seal 43 is achieved between radial surfaces 48 and 60 when tabs 74, 74'... $74^N$ are formed on flange 42. When tabs 74, 74'... $74^N$ are formed on flange 42, a tool is brought against the peripheral lip and into engagement with cylindrical surface 50 and all the tabs 74, 74'... $74^N$ are produced at the same time to prevent the introduction of distortions in the front and rear shells 12 and 14 which could cause a leak path through either the resilient seal or mechanical seals.

I claim:

1. A connection for joining a front shell to a rear shell to define a housing for a fluid pressure servomotor, said connection comprising:

a flange on one of said first and second shells, said flange having an inner surface with a first conical section that extends from a substantially first cylindrical section of said housing to a first radial section which extends from a second cylindrical section, said second cylindrical section having at least one outward protrusion; and a peripheral lip on the other of said first and second shells, said peripheral lip having a tab which engages said protrusion to locate said first and second shells with respect to each other, said peripheral lip having a second radial section that extends to a second conical section connected to a third radial section, said second conical section engaging said first conical section and said third radial section engaging said first radial section to establish first and second sealing surfaces, respectively, said second cylindrical section having inwardly projecting tabs that engage said third radial section to maintain said first and second sealing surfaces.

2. The connection as recited in claim 1 wherein said other of said first and second shells further includes an annular lip that extends from said first radial section toward said first cylindrical section to define a groove for retaining a bead of a diaphragm of a movable wall in said fluid pressure servomotor.

3. The connection as recited in claim 2 wherein said first sealing surface further includes: said first and second conical sections that compensate for any eccentricity that may be present in said first and second shells.

4. The connection as recited in claim 3 wherein said second sealing surface includes the periphery of said third radial section which engages said second cylindrical section to provide support to aid in reducing the introduction of distortion when said tabs are brought in engagement with said third radial section.

5. The connection as recited in claim 4 wherein said second cylindrical section is a substantially continuous annular ring.

6. The connection as recited in claim 5 wherein said front shell includes said flange and said rear shell said peripheral lip.

* * * * *